United States Patent
Ozaki et al.

[11] Patent Number: 6,106,976
[45] Date of Patent: Aug. 22, 2000

[54] SECONDARY BATTERY OR CELL WITH A NON-AQUEOUS ELECTROLYTE

[75] Inventors: Yoshiyuki Ozaki; Nobuo Eda; Akiyoshi Morita, all of Osaka-fu, Japan

[73] Assignee: Matsushita Electric Industrial Co., Ltd., Osaka-fu, Japan

[21] Appl. No.: 07/863,042

[22] Filed: Apr. 3, 1992

Related U.S. Application Data

[63] Continuation-in-part of application No. 07/709,994, Jun. 4, 1991, abandoned.

[30] Foreign Application Priority Data

Sep. 3, 1990 [JP] Japan .................... 2-233512

[51] Int. Cl.[7] .................................................. H01M 4/02
[52] U.S. Cl. ................... 429/218.1; 429/224; 429/231.8
[58] Field of Search ................................ 429/194, 217, 429/218, 232, 324, 218.1, 231.4, 224

[56] References Cited

U.S. PATENT DOCUMENTS

| | | | |
|---|---|---|---|
| 4,166,156 | 8/1979 | Ludwig | 429/104 |
| 4,423,125 | 12/1983 | Basu | 429/194 |
| 4,463,071 | 7/1984 | Gifford et al. | 429/194 |
| 4,615,959 | 10/1986 | Hayashi et al. | 429/194 |
| 4,668,595 | 5/1987 | Yoshino et al. | 429/194 |
| 4,725,422 | 2/1988 | Miyabayashi et al. | 423/445 |
| 4,863,818 | 9/1989 | Yoshimoto et al. | 429/218 |
| 4,980,250 | 12/1990 | Takahashi et al. | 429/194 |
| 5,028,500 | 7/1991 | Fong et al. | 429/194 |
| 5,069,683 | 12/1991 | Fong et al. | 29/623.1 |
| 5,153,082 | 10/1992 | Ogino et al. | 429/194 |
| 5,244,757 | 9/1993 | Takami et al. | 429/194 |

FOREIGN PATENT DOCUMENTS

WO 90/13924  11/1990  WIPO.

OTHER PUBLICATIONS

Mutsumi et al., Patent Abstracts of Japan, vol. 16, No. 236 (E–1210) May 29, 1992.

Primary Examiner—Maria Nuzzolillo
Attorney, Agent, or Firm—Wenderoth, Lind & Ponack, L.L.P.

[57] ABSTRACT

A secondary battery with non-aqueous electrolyte having a high voltage and capacity and an improved cycle property, characterized in that the battery has an anode which is comprised of graphite spherical particles provided with a lamellar structure and an optically anisotropic and single phase such as meso-carbon microbeads; and a cathode which is comprised of composite oxides containing lithium.

3 Claims, 4 Drawing Sheets aromatic group plane aromatic group plane

SECONDARY BATTERY OR CELL WITH A NON-AQUEOUS ELECTROLYTE

This application is a continuation-in-part of Ser. No. 07/709,994 filed Jun. 4, 1991 now abandoned.

FIELD OF THE INVENTION

The present invention relates to a secondary battery or cell (hereafter merely referred to as battery) with a non-aqueous electrolyte, particularly to a small-size, light-weight, new secondary battery.

BACKGROUND OF THE INVENTION

Recently portable and cordless tendency in electronic appliances for general use has been rapidly progressing. Accordingly, a demand for a small-size, light-weight secondary battery having a high energy density, used for charge and discharge power supply, has been increasing. From this point of view, non-aqueous batteries, and particularly lithium secondary batteries are anticipated as batteries having high voltage and energy density and the development of these batteries is urged.

Conventionally, manganese dioxide, vanadium pentaoxide, titanium disulfide and the like have been used as a cathode active material of the lithium secondary batteries. Such a battery comprises a cathode of these materials, a lithium anode and an organic electrolyte and charge and discharge are repeated. However, in a secondary battery employing a lithium metal anode, the problems of internal short circuit caused by dendritic lithium generated upon charging or side reactions between an active material and an electrolyte are a barrier to developing secondary batteries. Further, there has not yet been found a secondary battery which satisfies the high rate charge and discharge property and the over discharge property. Furthermore, the safety of the lithium batteries has been severely pointed out and in battery systems employing a lithium metal or a lithium alloy therein as an anode, the safety is very difficult to ensure.

Recently, a new type of negative electrode has attracted interest, in which the intercalating reaction of layered compounds is utilized for solving the above problems. Particularly graphite compound incorporating lithium has been investigated as an anode material for the attracted secondary lithium battery.

However, graphite compound incorporating lithium therein is very unstable and in the case of using natural or artificial graphite with high crystallinity as an anode, the battery lacks the cycle stability and the capacity thereof is low. Further since decomposition of the electrolyte takes place with charge and discharge reaction, graphite compound cannot substitute for a lithium anode.

Lately it has been found that lithium-doped materials of pseudo graphite materials, which are provided with more or less turbostratic structure and low crystallinity, obtained by carbonization of a variety of hydrocarbon or polymeric materials, are effective as an anode and can receive relatively wide application, and further have excellent stability in a battery. Accordingly many researches on small-sized, light-weight batteries with the use of these materials have been made.

On the other hand, as more carbon materials are used as an anode, it is proposed that such Li-contained compounds having higher voltage as $LiCoO_2$ or $LiMn_2O_4$ or composite oxide in which a part of Co and Mn is displaced by other elements such as, for example, Fe, Co, Ni, Mn and so on are to be used as a cathode active material.

On testing some of the afore-mentioned pseudo graphite materials, a capacity of only 100–150 mAh/g carbon is obtained and also polarization of carbon electrode, accompanied with charge and discharge, is relatively large. Therefore, when these carbon anode materials are used in combination with a cathode of, for example, $LiCoO_2$ and so on, it is disadvantageous to obtain relatively low voltage and it is difficult to obtain satisfactory capacity. In general, it has been reported that the upper limit of the amount of lithium chemically intercalated between the graphite layers corresponds to that which forms a graphite intercalation compound $C_6Li$ (called a first stage) wherein lithium atom is inserted between six carbon atoms. In this case, the capacity is theoretically calculated to 372 mAh/g carbon. In contrast to this, the capacity of pseudo graphite material is lower than that of the above case. This is the reason why the pseudo graphite has an undeveloped layer structure or low crystallinity of graphite, so that it is not enough for lithium to intercalate between the layer structure. On the other hand, it has been reported that in the case of using a graphite material with high crystallinity as an anode, intercalation reaction of lithium is difficult to proceed due to the gas generated upon charging on the surface of the graphite electrode surface by the decomposition of an electrolyte. It is found that in spite of generating the gases, coke with relatively high crystallinity heat-treated at a high temperature gives relatively high capacity (200–250 mAh/g). However, due to the expansion and contraction of the graphite in the C axis direction, accompanied by the charge and discharge reaction and by such a volume variation resulting from high capacity, such a high crystalline graphite anode is swollen and thus results in poor cycle property. That is, there is a tendency that the low crystalline graphite is superior in the cycle property while the high crystalline graphite is superior in the capacity.

SUMMARY OF THE INVENTION

Therefore, an object of the present invention is to provide a secondary battery, having high voltage, high capacity and an excellent cycle property, by which the abovementioned conventional problems can be solved.

For the purpose of overcoming these problems, research has been conducted for a carbon material having a high capacity, a superior cycle reversibility and a relative negative potential as an electrode. According to the present invention, a carbon material for anode is characterized in that the material comprises graphite particles in a lamellar structure provided with an optically anisotropic and single phase.

The inventors have come to recognize that high crystalline graphite material is preferable as the anode carbon material from the capacity and voltage properties of the battery, and have conducted research for many graphite materials concerning their physical property, shape and electrochemical property. As a result, it has been found that graphite particles provided with a lamellar structure comprising an optically anisotropic and single phase, especially among them the high crystalline graphite particle subjected to heat-treatment at a high temperature, is most preferred for the anode carbon material.

The battery which comprises an anode carbon material according to the present invention and a cathode of composite oxide containing lithium provides a high voltage approaching 4 V as a cell voltage, a high capacity and a superior cycle property.

The graphite particle provided with a lamellar structure and an optically anisotropic and single phase is typically meso-carbon microbeads (hereinafter referred to as MCMB) produced by heat-treating or graphitizing at a high temperature mesophase spherules which are obtained during pitch carbonizing process. There is a detailed explanation about the MCMB in Carbon 1974, Vol. 12, pp 307–319, Pergamon Press, Printed in Great Britain. Further, the graphitization degree of MCMB is an important factor as an anode material. As indicated by the physical property parameter of carbon, it is found that the lattice spacing at 002 plane (d002) should be within the size from 3.36 to 3.42 Å. For example, MCMB graphitized at a low temperature becomes pseudo graphite having a d002 of 3.43 Å or more, which provides a small capacity the same as the other pseudo graphite and a relatively noble potential as a carbon electrode, which properties are not preferable for an anode material.

For producing the graphite provided with the preferred d002, it is necessary to carry out the graphitization process at a temperature of 2000° C. or more under a gas atmosphere. The heat-treating from 2800 to 3000° C. can make the starting material graphitized to almost a full degree. On the other hand, the heat-treating of 3000° C. or more can not provide any further improvement on physical properties and results in an uneconomical process. Therefore, it is understood that the heat-treating temperature is preferred in a range of 2000° C. to 3000° C. under an inert gas atmosphere, more preferably in a temperature of about 2,800° C. and for a processing time of 10 to 14 hours.

Originally, this carbon material has a property easy to be graphitized, so that even high heat-treatment makes it possible to produce almost spherical graphite particles while they keep an original shape of mesophase spherules. Although the mesophase spherules are rather small spherical particles having the average diameter of 1 to 80 $\mu$m, the graphite particles after heat-treating keep the same diameter range as that of mesophase spherules. From the aspect of the anode property, there is obtained the excellent result in an relative small average diameter range from 1 to 10 $\mu$m. For producing such small mesophase spherules, it is allowable to select the spherical particles grown in a pitch melt treated in a low temperature of 300 to 500° C. during the carbonization process of pitch. It is more preferable to keep the pitch temperature to about 400° C. for 3 to 6 hours and select the spherical particles grown in such a condition.

Further, this graphite particle is characterized by a quite uniform single phase. For example, it is observed from a polarization microscope that the cross sectional view of the particle indicates a single phase with substantially no boundary area. Especially because of high crystalline and single phase, the anode made of such graphite particles shows a more negative potential and a flat potential plateau, so that it is advantageous from the aspect of battery voltage property. For example, in the case of these graphite particles, the reaction of intercalation and deintercalation with lithium proceeds within a quite negative potential range of 0.05 to 0.20 V versus Li potential.

Figure 1:
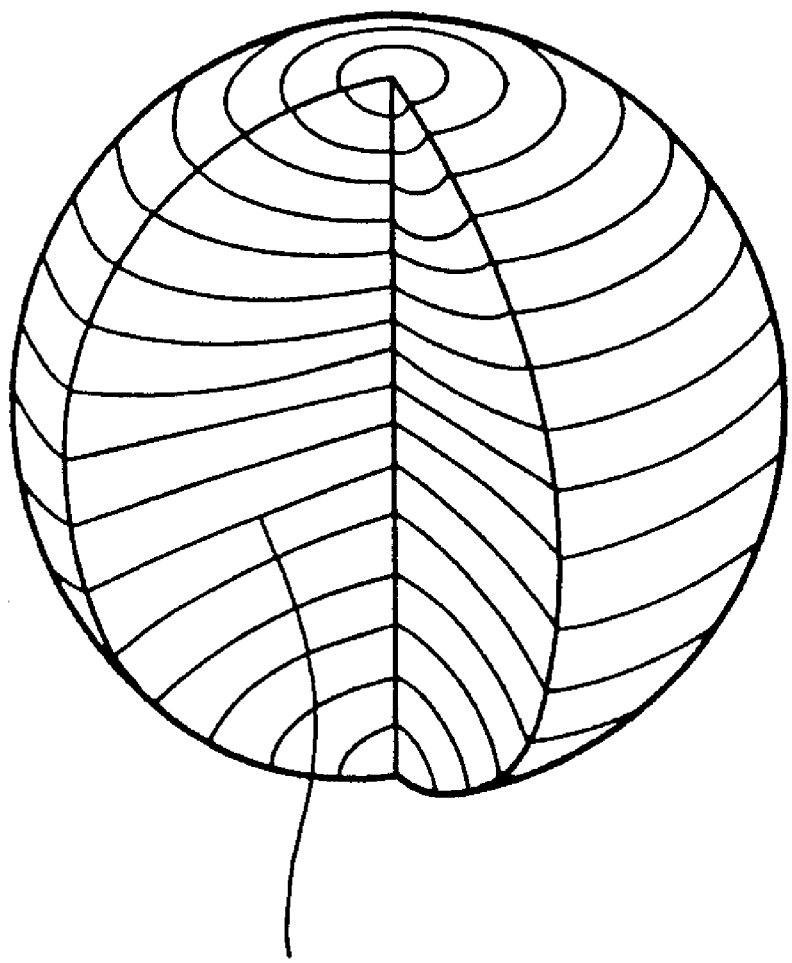
FIG. 1 shows a model view of the lamellar structure of the graphite material according to the present invention.
Figure 2A:
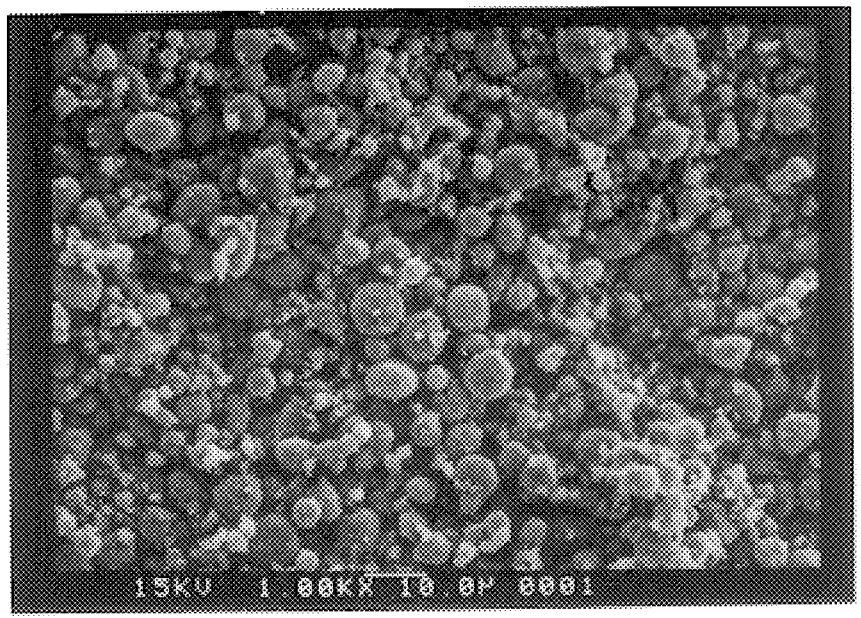
FIG. 2 shows scanning electron microscope photographs of the graphite material according to the present invention.
Figure 2B:
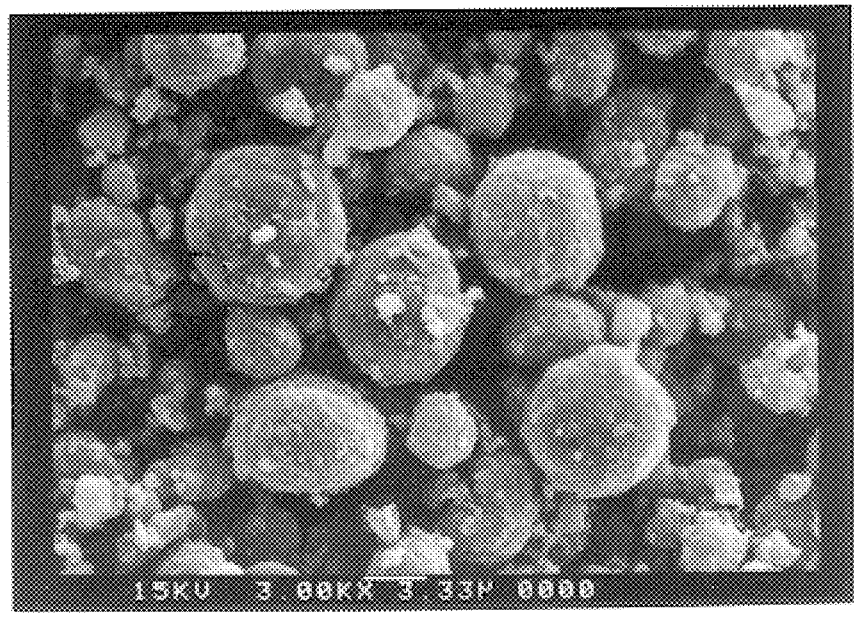

It is apparent from the literature (J. D. Brooks & G. H. Tailer, "Chemistry and Physics of Carbon" edited by P. L. Walker Jr., Marcel Dekker Inc., N.Y. 1968 Vol. 4 p243–286) that such a graphite is an anisotropic material provided with a uniform crystal phase structure. Further, it is characterized in that such a graphite comprises a lamellar structure as shown in FIG. 1, wherein crystal layers perpendicular to the C axis of the spherical particle are arranged in a manner of laminated discs, so that intercalation of Li is executed by inserting Li ion between the crystal layers. The lamellar structure makes it possible to insert Li at the all the sites of particle faces and results in quite smooth intercalation reaction providing a high capacity. Further, in addition to this realization of ideal intercalation reaction, it is understood from SEM photographs of FIG. 2 that almost true spherical shape makes it difficult for the graphite particle to expand and contract in the C axis direction and results in maintenance of superior cycle reversibility. As explained above, use of anode material according to the present invention provides a secondary lithium battery with high capacity and voltage and also the superior cycle property.

The graphite materials such as MCMB and mesophase spherules for starting material of MCMB are commercially available and are typically spherical graphite from SEC Co., Ltd in Japan and MCMB from Osaka gas Co., Ltd in Japan.

On the other hand, in the case of the cathode which comprises such compounds containing lithium as $LiCoO_2$ or $LiMn_2O_4$ or composite oxides in which a part of Co or Mn is displaced by other elements such as, for example, Fe, Co, Ni, Mn and so on, provision of Li ion relative to the charge and discharge reaction can be executed by the cathode material and results in the advantage that it is not necessary to previously provide Li ion to the anode and it is easy to compose the battery. In accordance with an objective composition, the composite oxides can be easily obtained from carbonate or oxide of lithium or cobalt as the raw material by mixing and heat-treating them. The heat-treating temperature usually ranges from 650 to 1200° C. Any known electrolytes and separators may be used and are not particularly limited. However, the electrolyte preferably comprises a solvent mixture mainly composed of ethylene carbonate (EC) dissolved with a salt of lithium, which provides relatively good results.

DETAILED DESCRIPTION OF THE PREFERRED EMBODIMENT

The preferred embodiment of the present invention will now be explained in detail.

Figure 3:
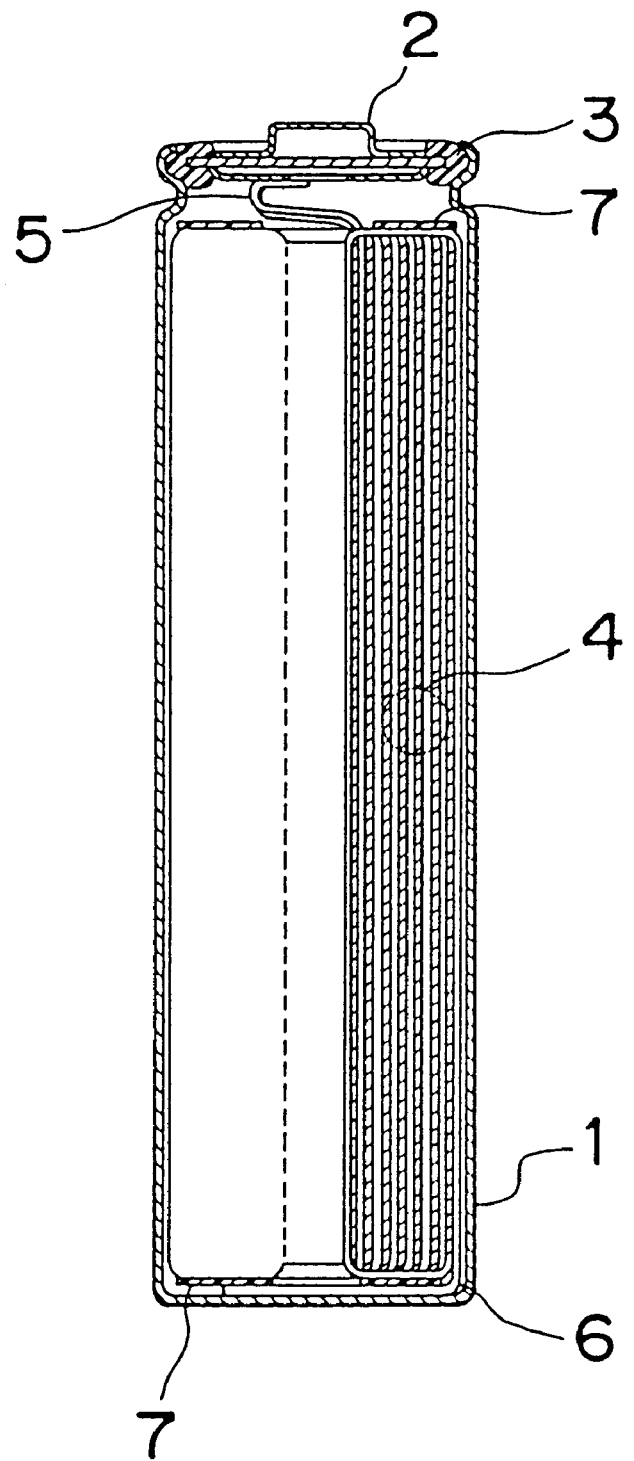
FIG. 3 is a longitudinal sectional view showing a cylindrical battery according to the present invention.

FIG. 3 shows a longitudinal sectional view of a cylindrical battery employed in the present embodiment. 1 denotes a battery case made of a stainless steel plate which is organic electrolyte-proof, 2 denotes a sealing plate provided with a safety valve and 3 denotes an insulating packing. 4 is a bundle of electrode plates, in which cathode and anode are wound several times through separators to be accommodated. A cathode lead 5 is taken out of the cathode and connected to the sealing plate. An anode lead 6 is taken out of the anode and connected to the bottom of the battery case 1. 7 denotes insulating rings, each of which is provided at upper and lower sides of the bundle of electrode plates, respectively. Hereafter the cathode and anode plates and the electrolyte and so on will be explained in detail.

EXAMPLE 1

The cathode is formed as follows.

100 weight parts of $LiCoO_2$ powder synthesized by heat-treating at 900° C. for ten hours after mixing $Li_2Co_3$ and $CoCO_3$, 3 wt. parts of acetylene black, 4 wt. parts of graphite and 7 wt. parts of fluorocarbon resin binder are mixed and then suspended in a carboxymethyl cellulose aqueous solution to form a paste. The paste is applied to both sides of aluminum foil of 0.03 mm thickness, dried and then rolled to form an electrode plate of 0.19 mm in thickness, 40 mm in width, 250 mm in length. The depolarizing mixture weighs 5 g.

To 100 weight parts of graphitized MCMB ($d002=3.38$ Å) heat-treated for about 12 hours at 2800° C., 10 weight parts of fluorocarbon binder is mixed and then suspended in a carboxymethyl cellulose aqueous solution to form a paste. The paste is applied to both sides of copper foil of 0.02 mm thickness, dried and rolled to form an electrode plate of 0.20 mm in thickness, 40 mm in width, 260 mm in length. The depolarizing mixture weighs 2.5 g.

The leads are attached to the anode and cathode plates, respectively, and the plates are wound through a separator of 0.025 mm in thickness, 46 mm in width, 700 mm in length, made of polypropylene to be stored in the battery case of 14.0 mm in diameter and 50 mm in height. Equivalent volume mixed solvent of propylene carbonate and ethylene carbonate, having lithium perchlorate dissolved therein in the ratio of 1 mol/l, is used as the electrolyte.

Then, the sealing is carried out to obtain the battery of the embodiment.

Comparative Example 1

Meso-carbon microbead ($d002=3.55$ Å) applied to heat treatment at 1200° C. is used as an anode. The other conditions of a battery in the comparative example 1 are the same as in the battery in the above Example 1.

Comparative Example 2

Needle coke ($d002=3.37$ Å) applied to heat treatment at 2800° C. is used as an anode. The other conditions of a battery in the comparative example 2 are the same as in the battery in the above Example 1.

Comparative Example 3

Natural crystalline graphite ($d002=3.36$ Å) is used as an anode. The other conditions of a battery in the comparative example 3 are the same as in the battery in the above Example 1.

Comparative Example 4

Fluid coke ($d002=3.39$) available from Superior Graphite Co., Ltd., of Chicago in USA under the designation 9400 series spherical graphite is used as an anode material. The other conditions of a battery are the same as in the battery in the above Example 1.

Comparative Example 5

Isotropic graphite ($d002=3.39$ Å) available under the designations EC-110 from Graphite Sales, Inc. of Ohio in USA is used as an anode material. The other conditions of a battery are the same in the battery in the above Example 1.

Figure 4:
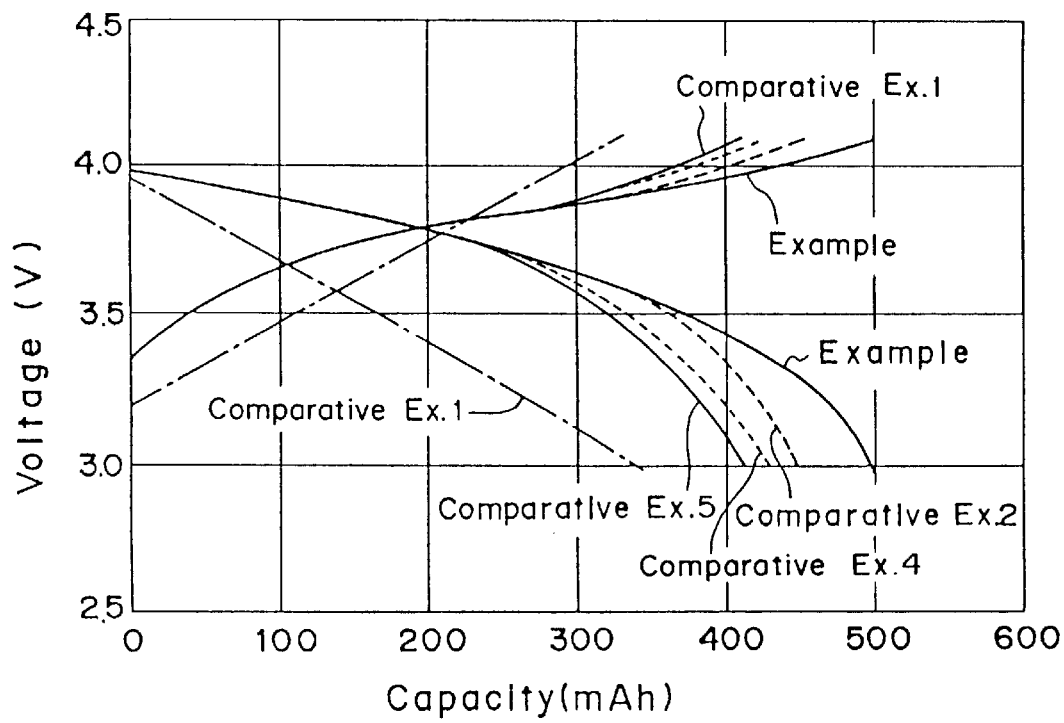
FIG. 4 comparatively shows the charge and discharge curves in the tenth cycle.
Figure 5:
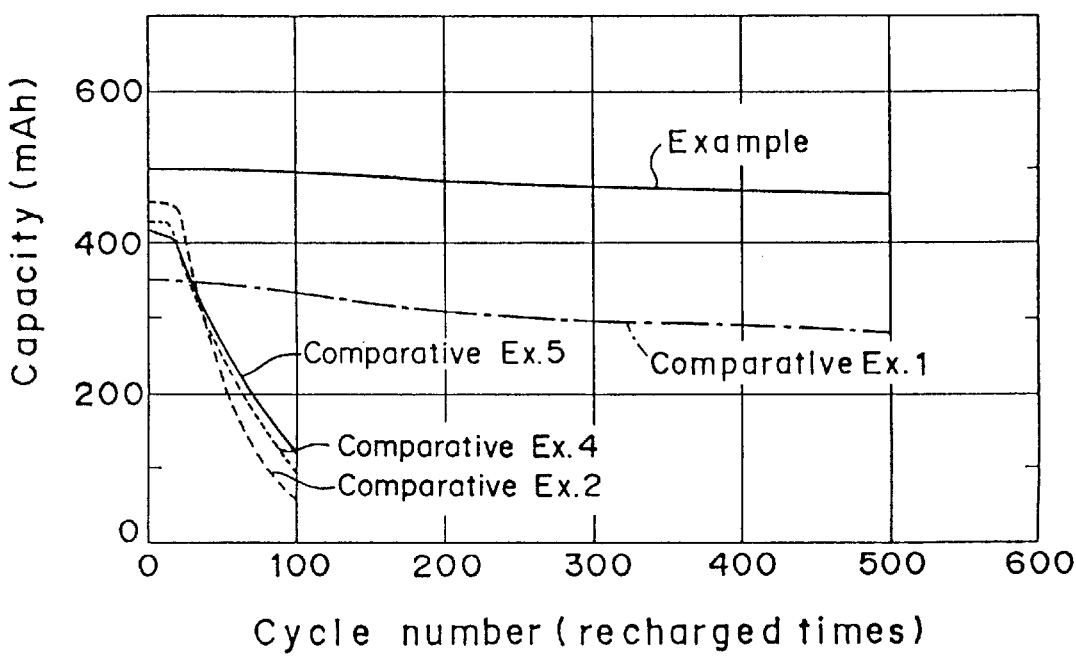
FIG. 5 comparatively shows the cycle properties.

Experiment of charge and discharge at a constant current of the batteries in the example and comparative examples is carried out under the conditions of 100 mA of charge and discharge, 4.1 V of the last charge and 3.0 V of the last discharge. FIG. 4 comparatively shows the charge-discharge curve in the tenth cycle. FIG. 5 comparatively shows the cycle properties. In the battery in the comparative example 3, upon charging, the safety valve functioned as the internal pressure increased and finally the electrolyte leaked. Accordingly the battery could no longer be used and the experiment was discontinued.

Natural graphite used in the comparative example 3 is a high graphitized material as clear from the d002 value, but generally comprises huge crystal particles or particles comprising continual crystal phase, so that Li intercalation between the crystal layers causes great strain on the huge particles and also a tendency to decompose electrolyte at the same time.

Therefore, the gas produced by decomposition of electrolyte during the charge and discharge are likely to be the cause of the electrolyte leakage.

The comparative example 3 is an exceptional case in that the graphite has huge crystal particles. The other graphite materials used in the example and the other comparative examples are not same as the above case.

As seen clearly from FIG. 4, the batteries of the Example 1 and the comparative example 2, in which the highly graphitized cathodic materials are used, have the capacity of 450–500 mAh and the average voltage upon discharging is as high as 3.7 V. The batteries of the comparative examples 4 and 5 have a lower capacity than that of the Example 1 and the comparative example 2, but the average voltage upon discharging is the same as above. On the contrary, the battery of the comparative example 1, in which the non-graphitized anode material is used, has only 350 mAh. The inclination of the charging and discharging curve is steep and the average discharging voltage is as low as 3.5 V. From the results, it is understood that except the material having huge crystal particles, there is a tendency to obtain the higher capacity and voltage by the anode carbon material graphitized to the higher degree. As seen clearly from FIG. 5, the cycle flatness of the batteries in the Example 1 and the comparative Example 1 is fair. On the contrary, the battery of the comparative examples 2 to 5 significantly deteriorates according to the cycles, and in the 50 cycles, the capacity of the battery has reduced to half or less of the initial capacity. Comparison with the capacity, voltage and cycle properties of the above Example 1 and the comparative examples indicates that best effects are obtained by the battery according to the present invention which comprises an anode made of MCMB graphitized in a high temperature. Such a graphite is characterized by a lamellar structure provided with an optically anisotropic and single phase. As clear from SEM photographs of FIG. 2, the graphite particle is almost spherical. Fluid coke of the comparative example 4 and gilsonite coke of the comparative example 5 similarly belong to the spherical graphite in terms of the shape. However, the above fluid coke is a large particle having average diameter of 100 μm or more and is not very spherical. Further, the preparing method and the particle structure are different from the MCMB case, which is apparent from the literature (M. INAGAKI, Y. TAMAI, S. NAKA and K. KAMITA, TEXTURE AND GRAPHITIZATION BEHAVIOR OF FLUID COKE, Carbon, 1974, Vol. 12, p 639–643). That is, the particle comprises multiple phases developed concentrically from the center of the coke core and belongs to isotropic graphite. Accordingly, the fluid coke may be called spherical graphite from the shape aspect, but the physical property is quite different from that of MCMB. The physical property differences between them significantly affects the battery function and property.

In the batteries provided with MCMB anode material, there is obtained a superior cycle property, but there is a great difference between them in the relation to the battery capacity and voltage property. This is apparently due to the difference of graphitizing degree.

Many kinds of samples provided with a variety of graphitizing degrees depending on heat-treating temperatures are prepared and the same battery tests as above are carried out. When the heat-treating temperature for graphitizing is 2000° C. or more, the graphitizing carbon has d002=3.42 Å or less which provides a capacity and voltage property approximate to that of the above present example battery. On the other hand, when it is less than 2000° C., d002 is 3.43 Å or more and thus accompanied by a decrease of heat-treating temperature, the capacity lowers, the slope of the charge and discharge curve becomes large and the discharge average voltage lowers. This characteristic is similar to that of pseudo graphite. When the heat-treating temperature decreases to 1200° C., d002 comes to be 3.55 Å and the property approaches that of the comparative example 1.

On the other hand, when the heat-treating temperature increases from 2000° C., the capacity and the discharge average voltage becomes high gradually. When it is from 2800 to 3000° C., the capacity and voltage property reaches a saturated point and, however, there is observed no change given to the property above in the case of 3000° C.

As explained above, it is preferable in the case of MCMB that the heat-treating temperature for graphitizing ranges from 2000° C. to 3000° C. from the aspect of the capacity and voltage property. That is, d002 of graphite is preferably between 3.36 to 3.42 Å. Preferable heat-treating condition comprises a heat-treating temperature of 2800° C. and a heat-treating time of 10 to 14 hours under an inert gas atmosphere.

Further, among many kinds of the electrolytes under the use of MCMB anode, it is preferable to select an organic solvent mixture mainly composed of ethylene carbonate containing a Li salt as a solute because such an electrolyte provides a relatively good property.

As is clear from the above description, the secondary battery with non-aqueous electrolyte according to the present invention, has an anode which comprises graphite particles provided with a lamellar structure and an optically anisotropic and single phase, such as meso-carbon microbeads subjected to a graphitizing process at high temperature. This anode is used in combination with a cathode comprising composite oxide containing lithium, and the battery provides high voltage and capacity and also is superior in the cycle property.

What is claimed is:

1. A secondary battery or cell comprising a cathode, an anode and a non-aqueous electrolyte containing a lithium salt assembled in a battery housing wherein:

said cathode comprises composite oxides containing lithium metal;

said anode is capable of being recharged repeatedly and comprises spherical graphite material capable of intercalation with lithium as an active material, the spherical graphite being mesocarbon microbeads, into which the lithium active material can be intercalated by means of a charging process.

2. The secondary battery or cell according to claim 1, wherein said cathode comprises at least one member selected from the group consisting of $LiCoO_2$, $LiMn_2O_4$, composite oxides of $LiCoO_2$ in which a part of Co is substituted by another element, and composite oxides of $LiMn_2O_4$ in which a part of Mn is substituted by another element.

3. The secondary battery or cell according to claim 1, wherein said mesocarbon microbeads have a lattice spacing (d002) of 3.42 Å or less, measured by a wide angle X ray diffraction method.

* * * * *